United States Patent [19]

Denker et al.

[11] Patent Number: 5,224,179
[45] Date of Patent: Jun. 29, 1993

[54] IMAGE SKELETONIZATION METHOD

[75] Inventors: John S. Denker, Red Bank; Hans P. Graf, North Middletown; Donnie Henderson, Freehold; Richard E. Howard, Highland Park; Wayne E. Hubbard, Toms River; Lawrence D. Jackel, Holmdel; Lawrence O'Gorman, Millburn, all of N.J.

[73] Assignee: AT&T Bell Laboratories, Murray Hill, N.J.

[21] Appl. No.: 814,956

[22] Filed: Dec. 30, 1991

Related U.S. Application Data

[63] Continuation of Ser. No. 288,338, Dec. 20, 1988, abandoned.

[51] Int. Cl.$^5$ .............................................. G06K 9/44
[52] U.S. Cl. ......................................... 382/55; 382/27
[58] Field of Search ....................... 382/55, 54, 27, 49, 382/50

[56] References Cited

U.S. PATENT DOCUMENTS

| | | | |
|---|---|---|---|
| 3,737,855 | 6/1973 | Cutaia | 382/54 |
| 4,034,344 | 7/1977 | Saraga et al. | 382/55 |
| 4,484,346 | 11/1984 | Sternberg et al. | 382/27 |
| 4,539,704 | 9/1985 | Pastor | 382/55 |
| 4,665,441 | 5/1987 | Sakaue et al. | 382/55 |
| 4,665,556 | 5/1987 | Fukushima et al. | 382/49 |
| 4,949,390 | 8/1990 | Iverson et al. | 382/55 |

OTHER PUBLICATIONS

"An Experimental Study of Machine Recognition of Hand-Printed Numerals" by R. Bakis, N. M. Herbst, and G. Nagy, IEEE Transactions on Systems Science and Cybernetics, vol. SSC-4, No. 2, Jul. 1968, pp. 119-132.

"Moment Normalization of Handprinted Characters:", by R. G. Casey, IBM J. Res. Develop., Sep. 1970, pp. 548-557.

"Some Studies in the Interactive Design of Character Recognition Systems", by W. C. Naylor, IEEE Transactions on Computers, Sep. 1971, pp. 1075-1086.

"SPTA: A Proposed Algorithm for Thinning Binary Patterns", IEEE Transaction on Systems, Man, and Cybernetics, vol. SMC-14, No. 3, May/Jun. 1984, pp. 409-418.

"Pattern Classification by Neural Network: An Experimental System for Icon Recognition", Proceedings of the IEEE First International Conference on Neural Networks, pp. IV-725-732. Mar. 1987.

*Primary Examiner*—Leo H. Boudreau
*Attorney, Agent, or Firm*—Henry T. Brendzel; Christopher N. Malvone

[57] ABSTRACT

A method for improved thinning or skeletonizing handwritten characters or other variable-line-width images. The method scans a template set over the image to be thinned. Each template has a specific arrangement of dark and light pixels. At least one of those templates includes either more than three pixels per row or more than three rows of pixels. An odd number is good choice. Moreover, the templates are chosen so that each template can unconditionally delete image pixels without consideration of the effect of such deletions on the behavior of the other templates. Thus the templates are independent of each other.

5 Claims, 9 Drawing Sheets

IMAGE SKELETONIZATION METHOD

This application is a continuation of application Ser. No. 07/288,338, filed on Dec. 20, 1988, now abandoned.

BACKGROUND OF THE INVENTION

This invention relates to pattern analysis and recognition and, more particularly, to systems for thinning or skeletonizing the strokes of imaged symbols, characters or binary-values images in general, that can be used in the classification process. This invention is related to an application, filed on even date herewith, entitled "Imaged Symbol Classification".

A wide variety of applications exist in which it is desirable for a machine to automatically recognize, analyze and classify character patterns in a given image. The explosion of computer-based information gathering, handling, manipulation, storage, and transmission systems offers the technology that makes the realization of these desires possible. Elaborate programs have been written for general purpose computers to perform pattern recognition, but they have experienced a limited level of success. That success was achieved mostly in the area of recognizing standard printed fonts.

One character recognition technique that dates back to the early 1960's involves following the curve of the characters to be recognized. It has an intuitive appeal but, unfortunately, it often fails when the characters are misshapen or have extraneous strokes.

Bakis et al. (IBM) reported on an approach for recognizing hand-printed numerals in an article titled "An Experimental Study of Machine Recognition of Hand Printed Numerals," *IEEE Transactions on Systems Science and Cybernetics* Vol SSC-4, No. 2, July 1968. In the described system, the numerals are converted into a 25×32 binary matrix. Features are extracted to reduce the dimensionality of the 800 bit vector (25×32) to about 100, and the 100 bit vector is submitted to several categorizers. Some "normalization" of the characters is also performed. The authors reported a recognition rate of between 86 to 99.7 percent, depending on the handwriting samples employed. Because of the low recognition rate relative to the desired level for commercial applications, the authors concluded that "it would seem that the course to follow is to combine curve-following type measurements ... with automatic feature selection and parallel decision logic."

In what appears to be a follow-up effort, R. G. Casey described an experiment that expanded the "normalization" of Bakis et al. to a process of deskewing of the subject characters. "Moment Normalization of Hand-printed Characters", *IBM Journal of Research Development*, September, 1970, pp 548–557. Casey used feature recognition in combination with curve following, as suggested by Bakis et al., and decision methodologies which included template matching, clustering, autocorrelation, weighted cross correlation, and zoned n-tuples.

In a subsequent article, Naylor (also of IBM) reported on an OCR (Optical Character Recognition) system that employs a computer, an interactive graphics console, and skew normalization. "Some Studies in the Interactive Design of Character Recognition Systems", *IEEE Transactions on Computers*, September, 1971, pp 1075–1086. The objective of his system was to develop the appropriate logic for identifying the features to be extracted.

In U.S. Pat. No. 4,259,661 issued Mar. 31, 1981, another extracted-feature approach was described by Todd. In accordance with the Todd approach, a rectangular area defined by the character's extremeties is normalized to a predefined size, and then divided into subareas. The "darkness" of the image within each of the subareas is evaluated, and the collection of the darkness evaluations is formed into a "feature vector." The feature vector is compared to a stored set of feature vectors that represent characters, and the closest match is selected as the recognized character.

In an article entitled "SPTA: A Proposed Algorithm for Thinning Binary Patterns", *IEEE Transaction on Systems, Man, and Cybernetics*, Vol. SMC-14, No. 3, May/June 1984, pp. 409–418, Naccache et al. present a different approach to the OCR problem. This approach addresses the fact that patterns are often made up of strokes that are wide, and that it may be of benefit to skeletonize the patterns. As described by Naccache et al, "skeletonization consists of iterative deletions of the dark points (i.e., changing them to white) along edges of a pattern until the pattern is thinned to a line drawing." Ideally, the original pattern is thinned to its medial axis. The article briefly describes fourteen different known skeletonization algorithms, and then proposes its own algorithm (SPTA). All of the described skeletonization algorithms, including SPTA, are based on the concept of passing over the image a square window of three rows and three columns (commonly referred to as a 3×3 window). As the square 3×3 window is passed across the image, the algorithms evaluate the 8 pixel neighborhood surrounding the center pixel and, based on the evaluation, either convert a black center point to white, or leave it unaltered.

Pattern classification received a boost from another direction with recent advances in the field of connectionism. Specifically, highly parallel computation networks ("neural networks") have come to the fore with the work by Hopfield, disclosed in U.S. Pat. No. 4,660,166, issued Apr. 21, 1987. Also, work continued on robust learning algorithms for multi-layered networks in which "hidden" layers of neural elements permit separation of arbitrary regions of the feature space. This work, reported on, inter alia, by Gullichsen et al. in "Pattern Classification by Neural Networks: An Experimental System for Icon Recognition", *Proceedings of the IEEE First International Conference on Neural Networks*, pp IV-725–732, Cardill et al., Editors, concentrates on the character classification process. The system they describe uses some image preprocessing but no feature extractions. Instead, they rely entirely on the inherent classification intelligence that the neural networks acquire through the "back propagation" training process. The reported system apparently works, but as suggested by the authors, many questions remained to be investigated. The system's performance is less than acceptable.

There exist many other character classification techniques, approaches, and algorithms. For purposes of this disclosure, however, the above references provide a reasonable description of the most relevant prior art. Suffice it to say that with all the efforts that have gone into solving the character recognition (i.e., classification) problem, the existing systems do not offer the accuracy and speed that is believed needed for a successful commercial system for recognizing hand written symbols.

SUMMARY OF THE INVENTION

This invention provides for improved thinning or skeletonizing of hand written characters or other variable-line-width images, to thereby permit recognition with a higher degree of accuracy. Moreover, the increased accuracy is achieved with an inherent increase in speed of processing.

Like Naccache et al., supra, our invention uses templates to scan over the image to be thinned. However, whereas the prior art systems employ 3×3 templates, our invention employs templates that are greater than 3×3. Further, our templates are chosen so that each template can unconditionally delete image pixels without consideration of the effect of such deletions on the behavior of the other templates. Thus the templates are independent of each other.

In accordance with one aspect of our invention the set of templates that is employed includes different templates, or masks, each having a specific arrangement of dark and light pixels. At least one of those templates includes either more than three pixels per row or more than three rows of pixels. An odd number, such as 5, is a good choice.

Line thinning is achieved by passing each template over the image, in steps. The number of steps is dependent on the chosen size of the template and the size of the image. At each step of each template, a decision is made whether to delete one or more pixels from the image. A conclusion to the affirmative is executed independently of the decisions made in connection with other templates. Because of the independence of the templates, our system for skeletonizing operates on all the templates simultaneously. This increases the processing speed substantially, thereby permitting effective OCR systems to be developed.

In accordance with another aspect of our invention, instead of passing a plurality of templates over the image, a single template is passed, but at each step the template is changed in size, starting with a template that is k×k, where k is greater than three, and decrementing the template by one with each sub step. At each substep, a test is made whether a deletion of a center core of size $(k-2)\times(k-2)$ would cause a discontinuity to be created. When it is determined that a discontinuity would not be created, the core is deleted.

DETAILED DESCRIPTION

Figure 1:
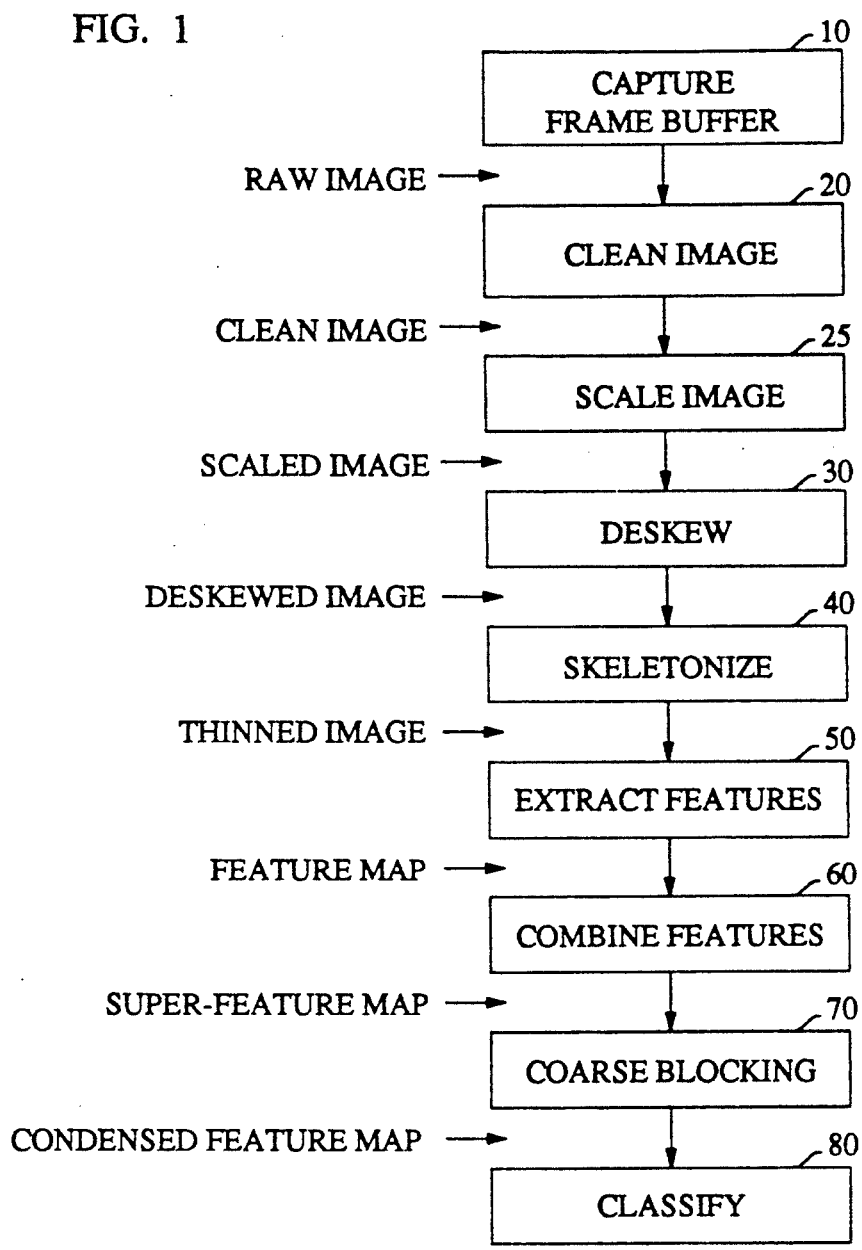
FIG. 1 presents a general flow diagram of a classification method.

FIG. 1 presents a flow chart of our process for character or symbol classification. In block 10, the character image is captured and, advantageously, stored in a frame buffer such as a semiconductor memory. The image may be obtained through electronic transmission from a remote location, or it may be obtained "locally" with a scanning camera. Regardless of the source, in accordance with conventional practice, the image is represented by an ordered collection (array) of pixels. The value of each pixel corresponds to the light (brightness, color, etc.) emanating from a particular small area of the image. The pixel values are stored in the memory.

Smudges and extraneous strokes are often found in proximity to characters, and their presence cannot help but make the recognition process more difficult. In accordance with our invention, block 20 follows block 10 and its function is to cleanse the image. This is the first step in our effort to remove meaningless variability from the image.

Usually, an image of a symbol or a character, such as a digit, contains one large group of pixels (contiguous) and a small number, possibly zero, of smaller groups. Our cleaning algorithm basically identifies all such groups and deletes all but the largest one. If the deleted groups, together, constitute more than a certain percentage of the original image, this fact is noted for later use, since it indicates that the image is anomolous. In the context of this description, it is assumed that the image symbols are composed of dark strokes on a light background. A "reversed" image can of course be handled with equal facility. The above cleaning algorithm also assumes that the symbol set that is expected in the image does not contain symbols that call for disjoint strokes. The digits 0–9 and the Latin alphabet (save for lower case letters i and j) form such sets, but most other alphabets (Hebrew, Chinese, Japanese, Korean, Arabic, etc.) contain many disjoint strokes. For such other sets a slightly different cleansing algorithm would have to be applied, such as looking as each disjoint area, rather than at the whole collection of such areas.

There are a number of processes that can be applied to detect and identify these extraneous areas. The process we use resembles a brush fire.

In accordance with our process, the image is raster scanned from top to bottom in an effort to find "black" pixel groups. When such a group is found (i.e., when a black pixel is encountered that has not been considered before), the scanning is suspended and a "brush fire" is ignited. That is, the encountered pixel is marked with an identifier, and the marking initiates a spreading process. In the spreading process, each of the eight immediately neighboring pixels are considered. Those neighboring pixels that are black are similarly marked with the identifier, and each marking initiates its own spreading process. In this manner, the first encountered pixel of a "black" group causes the entire group to be quickly identified by the selected identifier. At this point in the process, the scanning of the image resumes so that other groups can be discovered and identified (with a different identifier). When scanning is completed and all of the "black" areas are identified area calculations can be carried out. As indicated above, all but the largest group is deleted from the image (i.e., turned from dark to light, or turned OFF).

It may be noted at this point that in the character recognition art, it is more important to not make a mistake in identifying a character incorrectly, than to refuse to make a decision. For that reason, in a system that is designed to identify numerals or other character sets that do not have disconnected strokes, the area removal threshold should be set to a fairly low level.

Ordinarily it is expected that the pixels comprising the meaningful part of the image will be contiguous in a strict sense (in the aforementioned 0-9 character set and the Latin alphabet). On the other hand, an exception should be made, perhaps, when areas are separated only slightly, and external information leads one to believe that it is possible for a character stroke to be inadvertently broken (such as when writing with a poor pen or on rough writing surface). To provide for such contingencies, our process for spreading the "fire" includes an option for defining the neighborhood to include eight additional pixels that are somewhat removed from the eight immediate pixels (the eight pixels being corners of a larger window and center pixels of sides of the larger window). In effect, we permit the "fire" to jump over a "fire break".

The process of scaling the image to a given size, in block 25, follows the cleansing process. Scaling, of course, removes a meaningless variability of the image. The sequence of cleansing followed by scaling is imposed by the desire to not scale the image that includes smudges. The scaling process can use any one of a number of different algorithms. For example, in accordance with one algorithm, the image can be scaled in both dimensions by an equal factor, until one of the image dimensions reaches a fixed size. Another algorithm scales independently in the two dimensions, subject to some constraint on the largest difference in the scaling factors of the two dimensions. Both approaches work well and, therefore, choice of the algorithm and its implementation are left to the reader. We scale each of the character images with the first-described algorithm into a convenient number of pixels, such as an 18×30 pixel array.

People generally write characters at a slant. The slant is different from one person to another. The slant, or skew, of the characters is another meaningless variability of written characters that carries no information, and therefore, we remove it.

Returning to FIG. 1, block 30 which follows block 25 deskews the image. Stated differently, it is the function of Block 30 to make all characters more uniformly upright.

Block 30 can use any one of a number of conventional procedures for deskewing an image. One such procedure subjects the image to a transformation of the form $$\begin{bmatrix} u \\ v \end{bmatrix} = \begin{bmatrix} 1 - m_{xy}/m_{yy} \\ 0 & 1 \end{bmatrix} \begin{bmatrix} x - y_0 \\ y - y_0 \end{bmatrix},$$

where x and y are the original coordinates of the image, $x_o$ and $y_o$ define an origin point, u and v are the coordinates in the transformed image, and $m_{xy}$ and $m_{yy}$ are the image moments calculated by $$m_{xy} = \sum_{x,y} (x - x_o)(y - y_o)B(x,y),$$

and

-continued $$m_{yy} = \sum_{xy} (y - y_o)^2 B(x,y).$$

In the above, B(x,y) assumes the value 1 when the pixel at position x,y is "black", and the value 0 otherwise. The effect of this function is to reduce the xy moment to essentially 0.

Scaling (block 25) and deskewing (block 20) are both linear transformations. Therefore, the composition of the two is also a linear transformation. It may be advantageous to apply the compound transformation to the cleansed image to produce the deskewed image directly. This combined operation allows us to avoid an explicit representation of the scaled image as an array of pixels. This eliminates a source of (computation) noise.

Block 40, which in FIG. 1 follows block 30, thins the image. Thinning of the image also removes meaningless variability of the image. As indicated above, the prior art methods for skeletonization use a 3×3 window that is passed over the image. The center point of the 3×3 window is turned OFF if certain conditions are met; and those conditions, in most of the methods, involve repeated tests with different predefined window conditions. For example, the Ben-Lan and Montoto algorithm states that a dark center point is deleted (i.e., turned OFF or turned light) if it satisfies the following conditions:

1) the pixel has at least one light 4-neighbor; and
2) the neighborhood does not match any of 8 predefined 3×3 windows.

A 4-neighbor is a pixel that is east, north, west, or south of the pixel under consideration.

Algorithms like the one described above are quite acceptable in software implementations because, until recently, processors were able to handle only one task at a time anyway. However, these algorithms are necessarily slow because of their sequential nature. Furthermore, each of these prior art tests zeroes in on a certain characteristic of the pattern, but not on other characteristics. To thin strokes of different character (e.g., vertical lines and horizontal lines) different tests must be applied. Additionally, with prior art tests there is a need to perform at least some of these tests sequentially before one can be sure that a particular pixel may be deleted; and the pixel cannot be turned OFF until these tests are performed. The example of FIG. 2 illustrates the problem.

Figure 2:
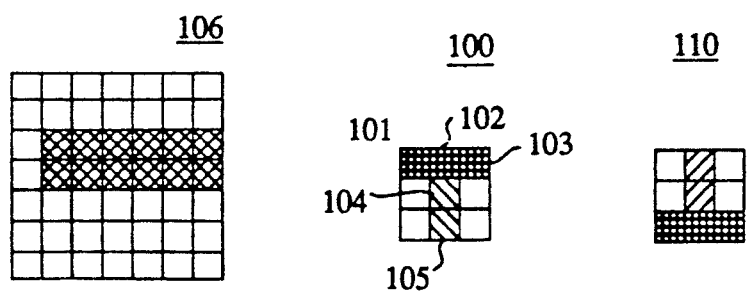
FIG. 2 presents an example of a problem resulting from use of independent 3×3 templates.

In FIG. 2, templates 100 and 110 are two 3×3 pixel windows. The three top pixels in template 100 are circle-hatched to designate searching for OFF pixels. The center pixel and the pixel in the center of the bottom row are crosshatched to designate searching for ON pixels. The remaining pixels are blank, to designate a "don't care" condition. Template 100 searches for the edge condition of light space (pixels 101, 102, and 103) above dark space (pixels 104 and 105), with the caveat that the dark space must be at least two pixels thick. When such a condition is encountered, the center pixel (104) is turned from ON to OFF (dark to light). Thus, template 100 provides a mechanism to nibble away from an ON area, from the top, until there is only one ON row left.

Template 110 operates similarly, except that it has the bottom row looking for OFF pixels while the center pixels of the first and second row are looking for ON pixels. Template 110 nibbles ON (dark) areas from the bottom.

The above templates which thin horizontal lines and do not thin vertical lines illustrate the desirability of passing a number of different templates over the image, with the different templates being sensitive to different characteristics of the image. It is also desirable (from a speed standpoint) to pass the various templates concurrently. However, in the FIG. 2 image segment 106, templates 100 and 110 cannot be applied concurrently because, if that were done, the depicted 2-pixel wide horizontal line would be completely eliminated. The top row would be deleted by template 100, and the bottom row would be deleted by template 110.

If line thinning is to be performed efficiently, this interdependence between different templates must be broken.

We found that, unexpectedly, this interdependence can be broken by employing a window that is greater than 3×3. Hence, we use a template set which contains at least some templates that are greater than 3×3. Some are 3×3, some are 3×4, some are 4×3, and some are 5×5. The characteristic of the collection is that the templates can be passed over the image concurrently. This capability comes about from the particular selection of templates, which allows the image to be altered in response to one template without having a deleterious effect on the ability of another template to independently alter the image. This fairly unique set of templates is shown in FIG. 3.

Figure 3:
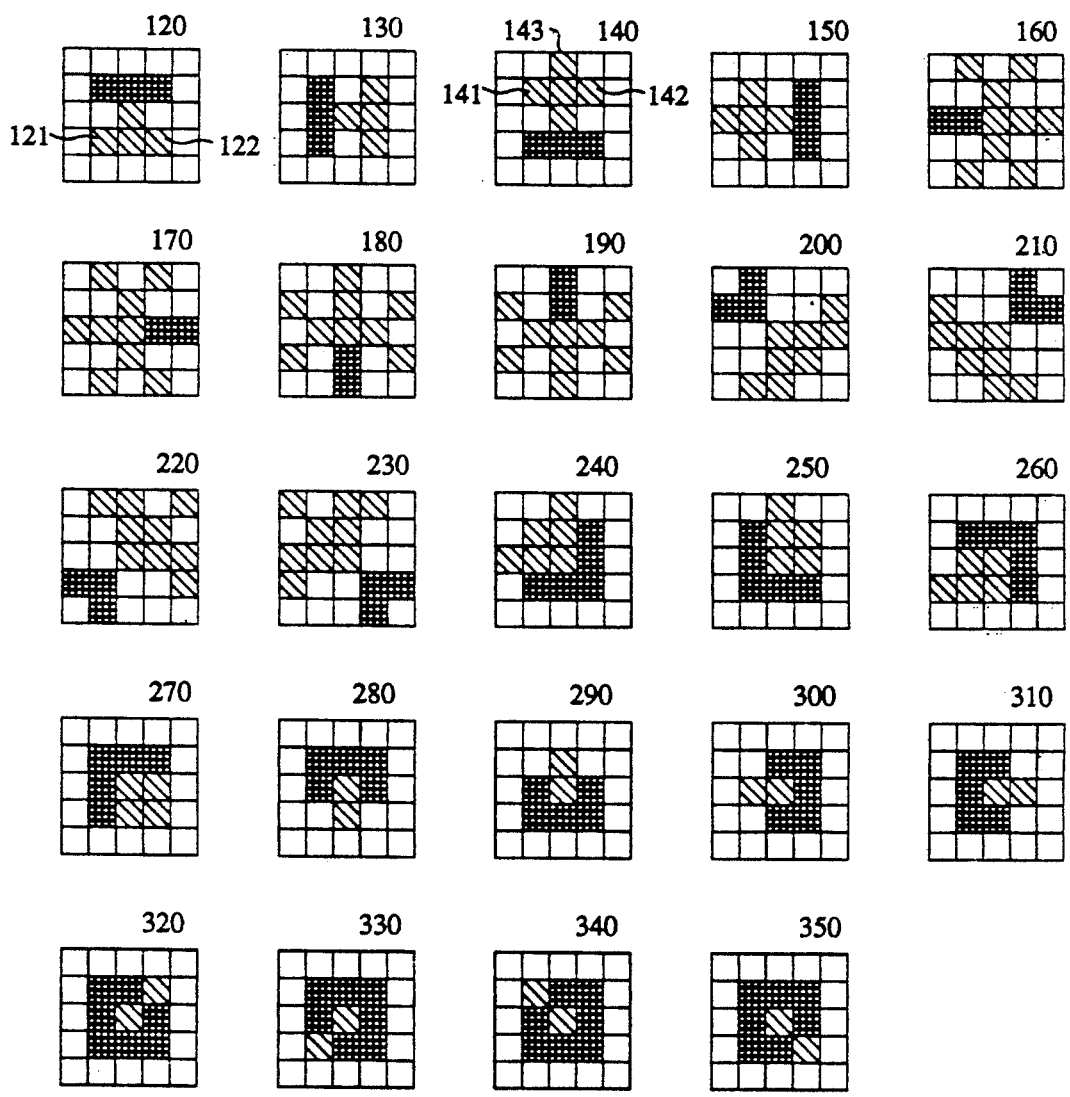
FIG. 3 shows the set of thinning templates used with our invention, which includes templates greater than 3×3.

We discovered that the set of templates depicted in FIG. 3 is a sufficient set. Other sets are possible, of course, but, in accordance with our inventions, such sets are characterized by the inclusion of at least one template that is greater than 3×3.

To describe the operation of the depicted templates, we start with templates 120 and 140. These templates correspond to templates 100 and 110 of FIG. 2. Template 120 is shown as a 5×5 array but, in essence, it forms a 3×3 window, since the outer columns and rows are at a "don't care" condition. Template 120 differs from template 100 in that pixels 121 and 122 in template 120 test for ON pixels, whereas the correspondingly positioned pixels in template 100 are set to "don't care". That is, template 120 makes sure that the pixel nibbled away (turned light) is above a line that extends in both directions. Template 140, on the other hand, differs from template 110 in that, effectively, it is a 3×4 template. It includes a 3×3 portion that is similar to the 3×3 template 110 (other than pixels 141 and 142), and it also includes a pixel 143 at the center of the first row. Pixel 143, in effect, requires a horizontal line to be 3 pixels wide before a pixel is permitted to be nibbled away (from the bottom).

Templates 130 and 150 form a template pair like the template pair 120 and 140. Templates 130 and 150 thin vertical lines. Templates 160, 170, 180, and 190 thin "knees" pointing to the right, left, up and down, respectively; templates 200, 210, 220 and 230 thin slanted lines from above and from below; etc. It may be noted that templates 160-230 are all 5×5 templates.

In accordance with another approach to skeletonization, we have discovered that templates of size k×k, where k is greater than 3, can follow a specific algorithm for any value of k. This algorithm can be implemented iteratively or in parallel. The operation of the k×k template is to erase the central (k−2)×(k−2) core of the template whenever certain criteria are met. As can be anticipated, larger values of k result in coarser thinning but require fewer computations.

The thinning criteria can be stated as follows. For a k×k template, if its core, R(x,y,k) is ON (dark), then it may be turned OFF (deleted, or turned light) if:

1. $\chi(\eta) = 1$,
2. $\phi_1(\eta) > k - 2$, and
3. $\phi_0(\eta) > k - 2$, where $\phi_0(\eta)$ is the maximum length (in pixels) of chains of 4-connected OFF pixels in the 4(k−1) perimeter of pixels surrounding the core. This is the neighborhood, $\eta$. Also, $\phi_1(\eta)$ is the maximum length of chains of 8-connected ON pixels in the neighborhood and $\chi(\eta)$ is the number of chains of 8-connected ON pixels in the neighborhood. The value of $\chi(\eta)$ can be calculated in accordance with $$\chi(\eta) = \frac{1}{2}\left[\sum_{\substack{j=0 \\ \{i,i-1\}\neq(k-1)}}^{4(k-1)-1} |\eta(i) - \eta(i-1)| + \sum_{m=n(k-1)} |\eta(m+1) - \eta(m-1)|\right] + \sum_{m=n(k-1)} \eta(m)|\eta(m) - \eta(m-1)||\eta(m) - \eta(m+1)|,$$

for $n = 0,1,2,3$ and $\eta(-1) = \eta(4k - 5)$.

In the above, $\eta(i)$ corresponds to the $i^{th}$ pixel in the neighborhood $\eta$, counted from the top left corner of the neighborhood and moving clockwise; and the value of $\eta(i)$ is 1 when the corresponding pixel is ON and 0 when the corresponding pixel is OFF. Eight-connectedness is defined in the following manner. Two pixels are in the same 8-connected chain if one is adjacent to the other in any of its 8 neighbors. Whereas, 4-connected chains contain adjacent neighbors only in horizontal or vertical directions; not diagonal.

Criterion (1) is necessary so that the connectivity of the structure is not altered. If $\chi(\eta) = 1$, then the neighborhood contains a single chain of 8-connected ON pixels, and the erasure of the core does not break connectivity between the core and any ON chains in the neighborhood. If $\chi > 1$, then there are two or more chains of 8-connected ON pixels in the neighborhood, and erasure of the core will separate the chains, destroying connectivity. If $\chi = 0$, then the core is either isolated with no neighborhood pixels that are ON, or it is enclosed completely by ON pixels. In such a case erasure is not desired.

Criterion (2) maintains endlines (an endline is the end of a line). At level k, an endline is defined as that with width less than or equal to the length of the core side, k−2. For a core which has an 8-connection ON chain of k−2 pixels or fewer, that core is defined as an endline at level k, and maintained. When $\chi(\eta) = 1$, $\phi_1(\eta)$ is equal to the number of ON pixels in the neighborhood.

Criterion (3) can be viewed as the inverse condition of criterion (2). Where criterion (2) prevents endlines from being eroded, criterion (3) prevents inward erosion of OFF regions into ON regions.

The steps of the sequential, multi-value k×k thinning algorithm are listed below.

1. For each location (x,y) in ascending x,y order:
   (i) set k'=k;
   (ii) for kernel R(x,y,k'), consider any erased neighborhood values as ON, and test the thinning criteria;
   (iii) if the thinning criteria are met in (ii), then for each side and its adjoining corners, set any erased values to OFF—except for an ERASED$_A$ anchor value in the NW corner that is set to ON—and set all other erased valued to ON; test connectivity with respect to the thinning criteria, and if they are met, set the core to ERASED, or ERASED$_A$ if it is an anchor core; otherwise, set k'=k'−1, and if k'≧3 go to (ii);
2. if no pixels were turned to ERASED or ERASED$_A$, stop; otherwise, set all ERASED and ERASED$_A$ values to OFF, and repeat (1).

In the above, an anchor is a core that is located at the beginning endline of a diagonal that is oriented in the direction of scanning. When it is erased, its pixels are marked with values ERASED $_A$, and this marking is used to prevent further erosion of the endline. For the NW-to-SE scanning order, an anchor is a NW endline; that is, a kernel whose north side and two corners, and whose west side, contain only OFF values.

In the parallel algorithm, all the pixels of the image can be operated upon simultaneously because the thinning results on a pass do not affect the thinning operations on that pass. To accomplish this independence, each iteration (application of the criteria to windows throughout the entire image) is separated into four separate sub-cycles and thinning is applied only to kernels which are on N, S, E, and W borders on the four subcycles respectively.

The rules which are used to assign compass directions to a kernel are the following:

a kernel is a north border kernel if the side on the north contains only OFF values (a "side" refers to the perimeter pixels in a row or a column, excluding the corner pixels);

a kernel is a south border border kernel if the side on the south contains only OFF values and the kernel is not a north border kernel;

a kernel is an east border kernel if the side on the east contains only OFF values and the kernel is not a north or south border kernel; and a kernel is a west border kernel if the side on the west contains only OFF values and the kernel is not a north, south, or east kernel.

Figure 5:
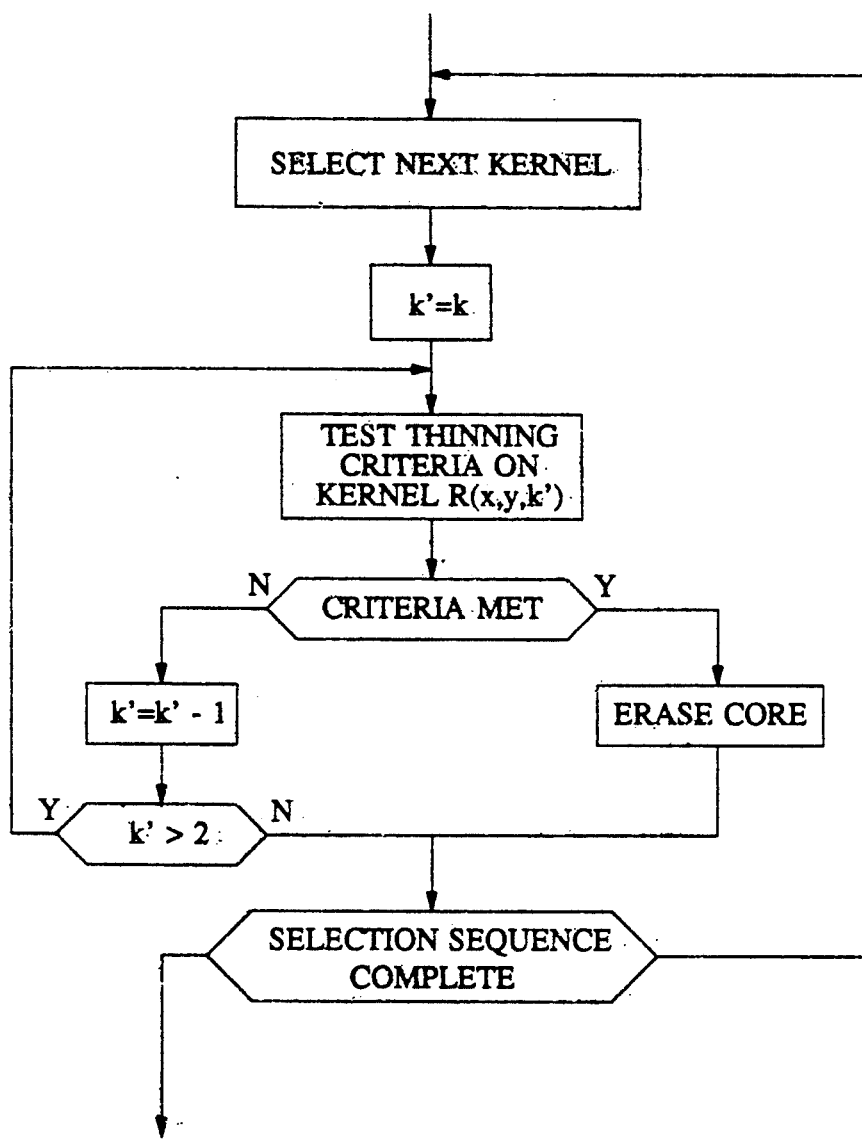
FIG. 5 presents a flow chart of a thinning procedure that is different from the procedure used in connection with the templates of FIG. 3 but which employs windows that are greater than 3×3.

The general flowchart of the algorithm is shown in FIG. 5. Depending on whether a sequential or a parallel implementation is desired, the algorithms differ in their specifics, as described below.

The steps of the parallel, binary k×k thinning algorithm are listed below. Note that for this algorithm there is no need to retain erased values, erasure is to OFF.

1. In a repeating circular sequence in the order, {N, S, E, W}, do for all border kernels:
   (i) set k'=k;
   (ii) for kernel R(x,y,k'), test the thinning criteria, and if they are met, erase the core to OFF; otherwise, set k'=k'−1, and if k'≧3, repeat (ii).
   (iii) If no pixels were erased on the last four consecutive subcycles, stop; otherwise repeat (1) for the next border direction in the sequence.

This ends the thinning process description.

Returning to FIG. 1, Skeletonization block 40 is followed by feature extraction block 50. Although operationally similar, skeletonization is different from feature extraction from a functional stand point. In the former, one identifies superfluous pixels and turns them from dark to light. In the latter, one identifies relatively macroscopic characteristics that help classify the character. The macroscopic characteristics identified are the kind of characteristics that are not dependent on the size or thickness of the character, but are the ones that give the character its particular "signature". Hence, it is these characteristics that block 50 seeks to identify.

Figure 4:
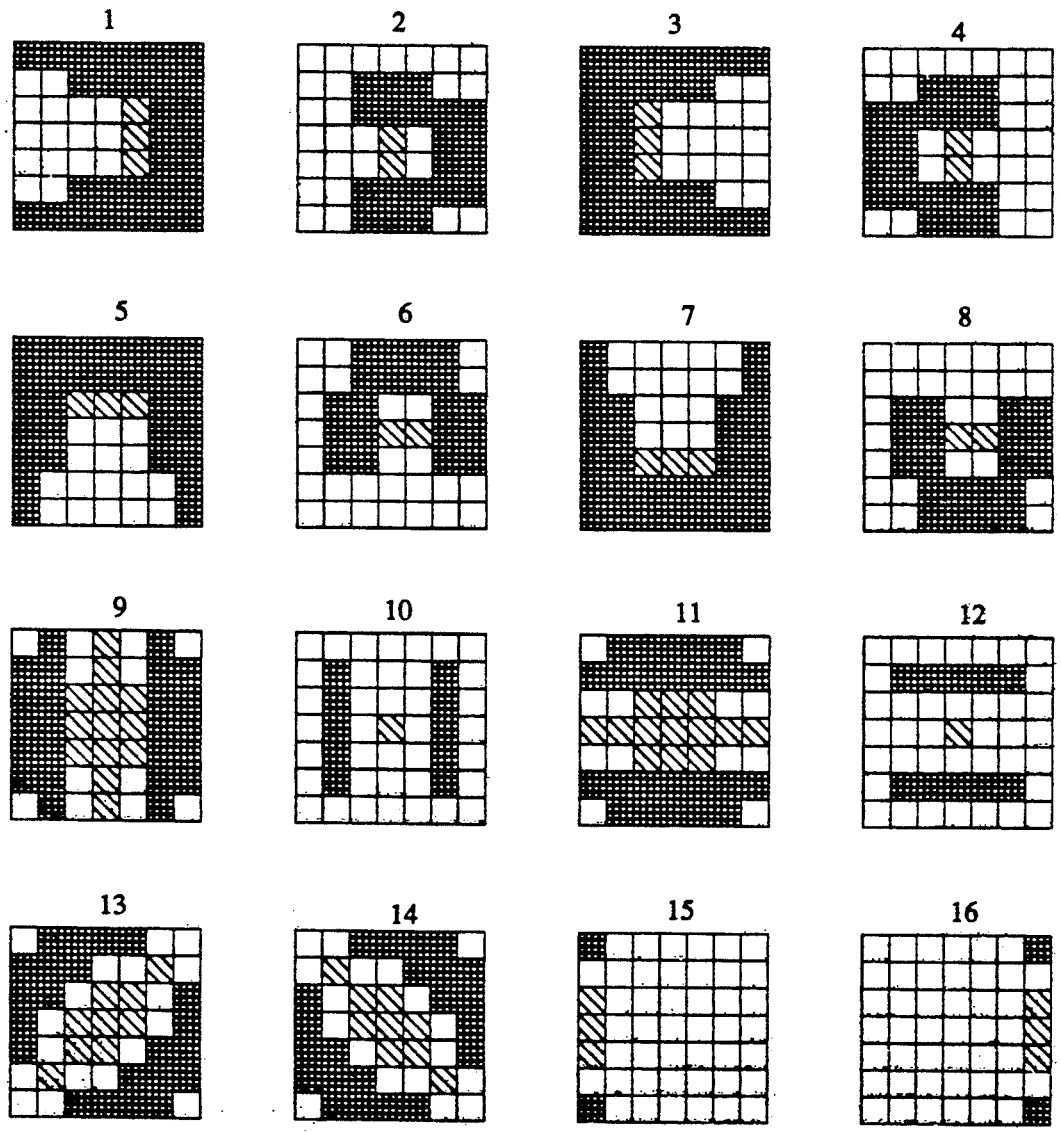
FIG. 4 depicts a set of feature extraction templates.
Figure 4:
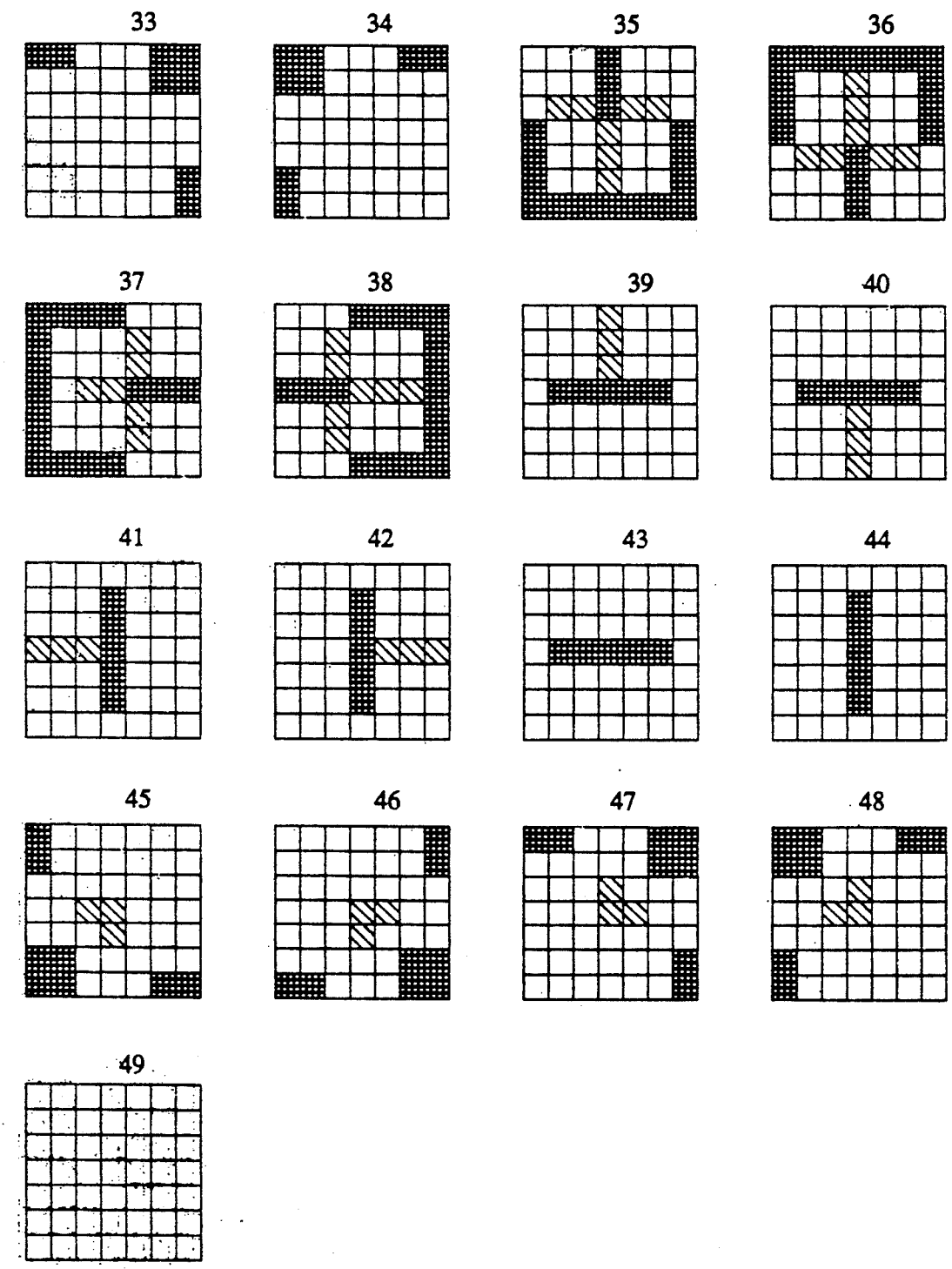
Figure 4:
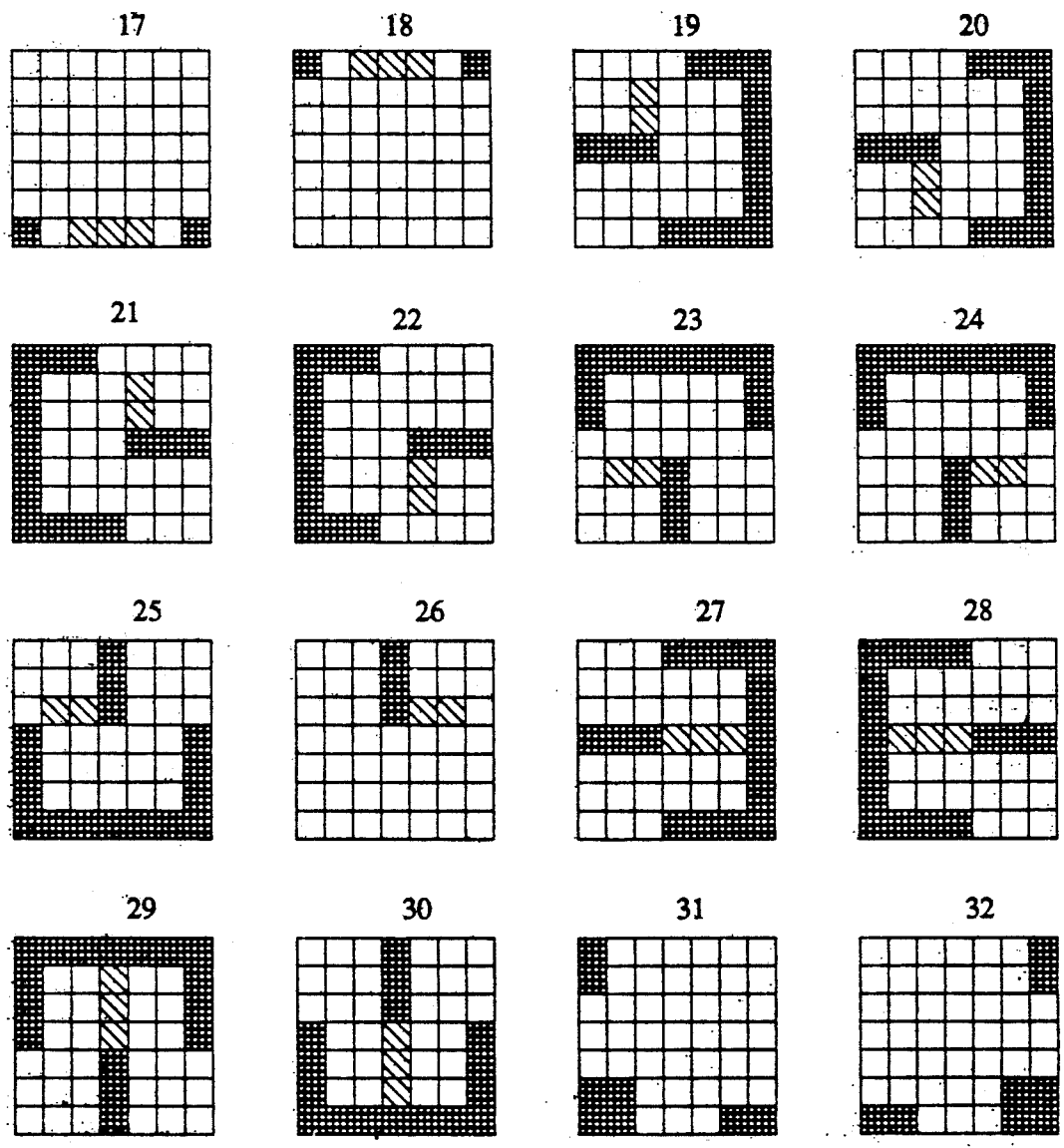

Operationally, feature extraction is accomplished by passing a collection of windows over the image. Each window in our system is a 7×7 template, and each template detects the presence of a particular feature; such as an end point, diagonal lines, a horizontal line, a vertical line, etc. The detection works by a majority rule in the sense that when the majority of the 49 pixels (7×7) fit the template, it is concluded that the feature is present. In our system we employ 49 different 7×7 templates, as depicted in FIG. 4. For each of the templates we create a "feature map" which basically indicates the coordinates in the image array where the pattern of the template matches the image.

Having developed the 49 feature maps corresponding to the 49 templates of FIG. 4, we develop a number of super-feature maps in block 60 that are logical combinations (AND and OR) of the feature maps. We thus reduce the set from 49 maps to 18 maps (of 18×30 pixel arrays). The reduced number has been determined heuristically.

We call the arrangements of the detected features "maps" because we structure an array (in the memory where we store them) and we place the feature detections in the appropriate locations in the array. In this manner we record the presence of a feature and its location. Other mechanisms for recording "hit" location designations can be used, but it is still conceptually simpler to think in term of maps.

It turns out that the 18×30 array is too detailed for classification purposes. The detail can actually mask the character and make the classification task more difficult (as in the saying "you can't see the forest for the trees"). Accordingly, block 70 performs coarse blocking to reduce the 18×30 feature maps to feature maps that are only 3×5. This results in a final map or vector of 270 bits, which corresponds to the 18 3×5 maps.

Lastly, block 80 performs the classification algorithms to determine, from the given 270 bits, the most likely classification candidate. A simple algorithm, such as determining the lowest Hamming distance, will suffice once it is known what templates most likely correspond to the characters that are to be identified. The key, of course, lies in determining these templates; and that aspect calls for the learning methodologies (such as back propagation) that the art is currently dealing with.

HARDWARE EMBODIMENT

Although FIG. 1 depicts the process of our OCR system, it is also quite representative of the hardware realization. The actual details of the signal flow would vary with the particular design, but that is perfectly well within the conventional circuit design arts. For purposes of the following discussion, it may be considered that our system operates in a pipelined fashion and that each electronic circuit block applies the necessary signals and controls to the following circuit block, together with the necessary identification as to which pixel is being considered.

As suggested earlier, block 10 comprises conventional apparatus that is tailored to the particular source of the image to be classified. It can simply be a video camera coupled to a commercial "frame grabber" and a memory. When the classification process begins, the memory is accessed to retrieve the center pixels and the 24 neighboring pixels, and the collection of retrieved signals is applied to block 20.

Blocks 20 and 30 are currently implemented on a SUN workstation with the simple programs presented in the appendix. Local memory is included with the microprocessors to store image signals and temporary computation results, as necessary. Practically any microprocessor can be similarly utilized, but if higher speed is required than is obtainable with a microprocessor, specific hardware can be designed in a conventional manner to carry out the needed calculations. In fact, since the operations required are merely additions, subtractions, comparisons, and rudimentary multiplications, a pipelined architecture can easily be designed that offers very high throughputs.

The output of block 30 is a sequence of signal sets, each having an associated center pixel and its neighboring pixels. Block 40 is implemented with the neural network of FIG. 6 which includes a series connection of a switch 400, a template match network 410, and a threshold network 420. The input signals, which correspond to the 25 pixel values of the image covered at any instant by the 5×5 window are applied to switch 400 at inputs its. Switch 400 insures that these values are applied to network 410 simultaneously. Network 410 includes 25 input leads and a number of output leads that equals the number of templates stored. Within network 410, all input leads are connected to each output lead through a column of preset connection nodes. Each such column of connection nodes (e.g. the column containing nodes 411-414) corresponds to a stored template. Thus, the signal of each output lead represents the affinity of the input signal to a different template. More specifically, the connection nodes are of three "varieties"; to wit, excitatory (E), inhibitory (I), and "don't care" (D). Response to a match or a mismatch differs with each of the varieties in accordance with the truth table below.

| input | synapse | output |
|-------|---------|--------|
| 0 | E | 0 |
| 1 | E | 1 |
| 0 | I | 0 |
| 1 | I | −2 |
| 0 | D | 0 |
| 1 | D | 0 |

Nodes 411 that implement this truth table are easily realized with grated amplifiers.

The information of whether a node is an E, I, or D node, can be stored in a two flip-flop set associated with each node (when variability is desired). Alternatively, the information can be "hardwired" with an array of links associated with the array of nodes. The programming of the templates (i.e., connections) can be achieved through a burn-through of the appropriate links. Of course, if the templates are completely unchanging, one can design the template information directly into the integrated circuit mask of the nodes' array.

The current of the output lines flows into an impedance, and the flow causes the voltage of each output line of network 410 to rise to a level that is proportional to the degree of match between 1's in the set of input signals and excitatory nodes. Of course, the voltage is also diminished by the degree of match between 1's in the set of input signals and the inhibitory nodes.

The output lines of network 410 are applied to threshold network 420, where that impedance can optionally be placed. Network 420 applies a set of thresholds to the output signals of network 410. Specifically, network 420 comprises a set of two-input amplifiers (e.g., 421-424) having one input responsive to the input leads of network 420, and a number of sources (e.g., 425-427) that connect to the second input of amplifiers 421-424. Each of the sources supplies a different current and, correspondingly, each amplifier 421-424 develops a voltage on its second lead that is related to the specific connection that the lead has to sources 425-427. In this manner, different thresholds can be applied to the different amplifiers within network 420. The output leads of network 420 are the outputs of amplifiers 421-424, and they take on the logic value 1 or 0, depending on whether the signal input of an amplifier exceeds the threshold or not.

Figure 6:
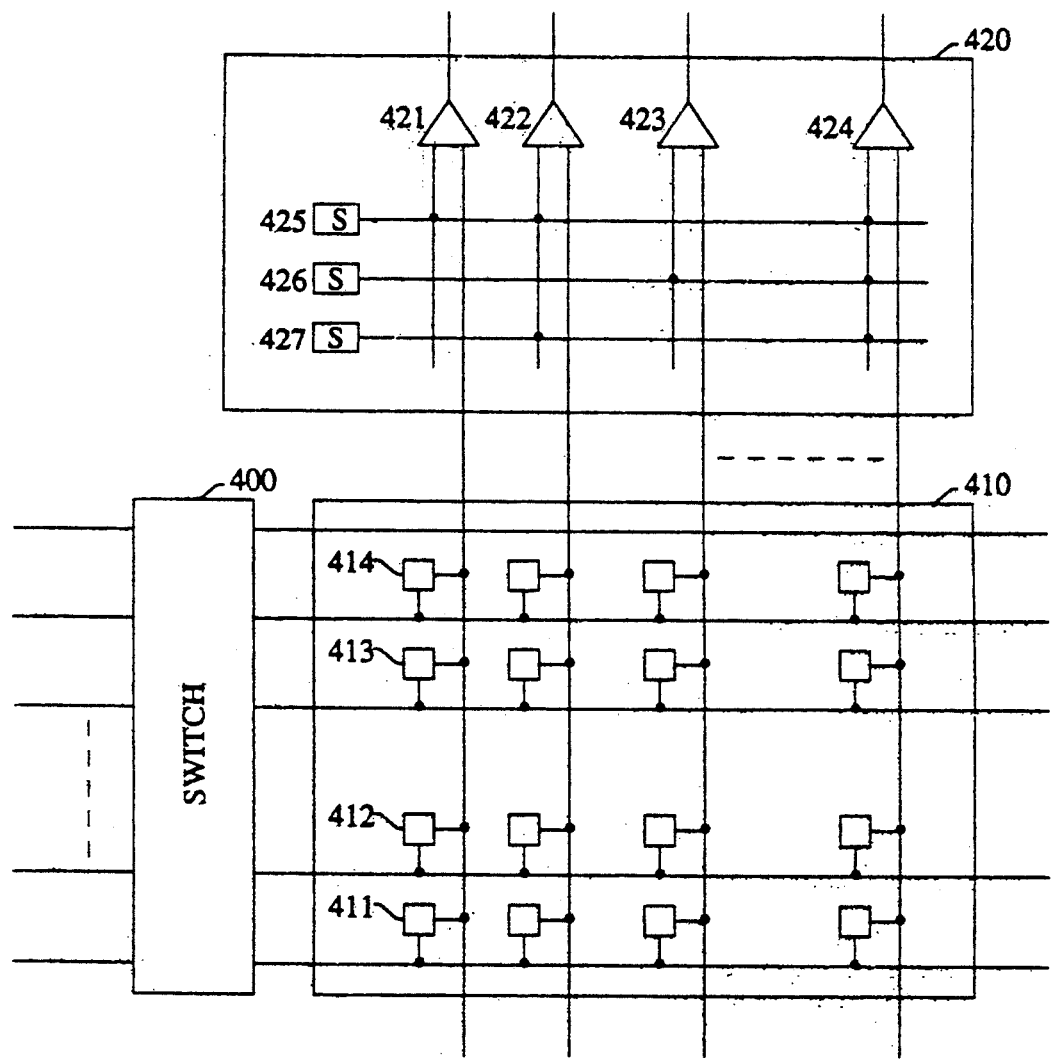
FIG. 6 illustrates the structure of a neural network decision circuit used in connection with the templates of FIGS. 3 and 4.

Block 50 is constructed with a neural network such as the one depicted in FIG. 6. However, since the block 50 neural network deals with 7×7 templates as compared to the 5×5 templates of block 40, a memory 55 is interposed between the two neural networks to buffer the data.

Block 60 generates the 18 feature maps. It simply takes the outputs of block 50 and, together with the signal that specifies the identity of the center pixel, stores the appropriate information in a memory. The result is 18 memory segments, with each segment containing information about the features found in the image. Each such segment is, thus, one of our feature maps.

The coarse blocking of block 70 is achieved by using 18 additional smaller memory segments, perhaps in the same physical memory device. In these smaller memory segments, block 70 stores information about the features that are found in appropriately selected portions of the larger memory segments. When the original image is 18 pixels by 30 pixels in size, the selection can be easily accomplished with a counter that operates in modulus 5, where the full value of the counter is used to access the larger segments, while the whole number after division by the modulus is used to identify the cells in the 18 smaller memory segments.

The 270 memory locations of the smaller memory segments form the output of block 70 and make up, in effect, a vector that describes the character contained in the image.

The last function that needs to be carried out is to apply this vector to some network that would select the most likely candidate character for the given feature vector. This is the function of block 80.

Block 80 can be implemented in many ways. For example, the content-addressable teachings of Hopfield in the aforementioned U.S. Pat. No. 4,660,166 can be used to advantage. In accordance with his teachings, one can impart to the feedback network of his circuit the information about the characters in the subject set. With such information in place, the content-addressable memory identifies the feature vector of the character that is closest to the applied feature vector. The Hopfield network is very robust in making the "correct" choice even when the input appears to be quite distorted. It is a little difficult, however, to design the feedback network for the Hopfield circuit because all of the stored vectors are distributed throughout the feedback network and commingled with one another. This difficulty is compounded by the fact that we do not exactly know how we recognize a "4", or the limits of when we can recognize a "4" and when we are so unsure as to decline to make a decision. Yet, we know a "4" when we see one!

Figure 7:
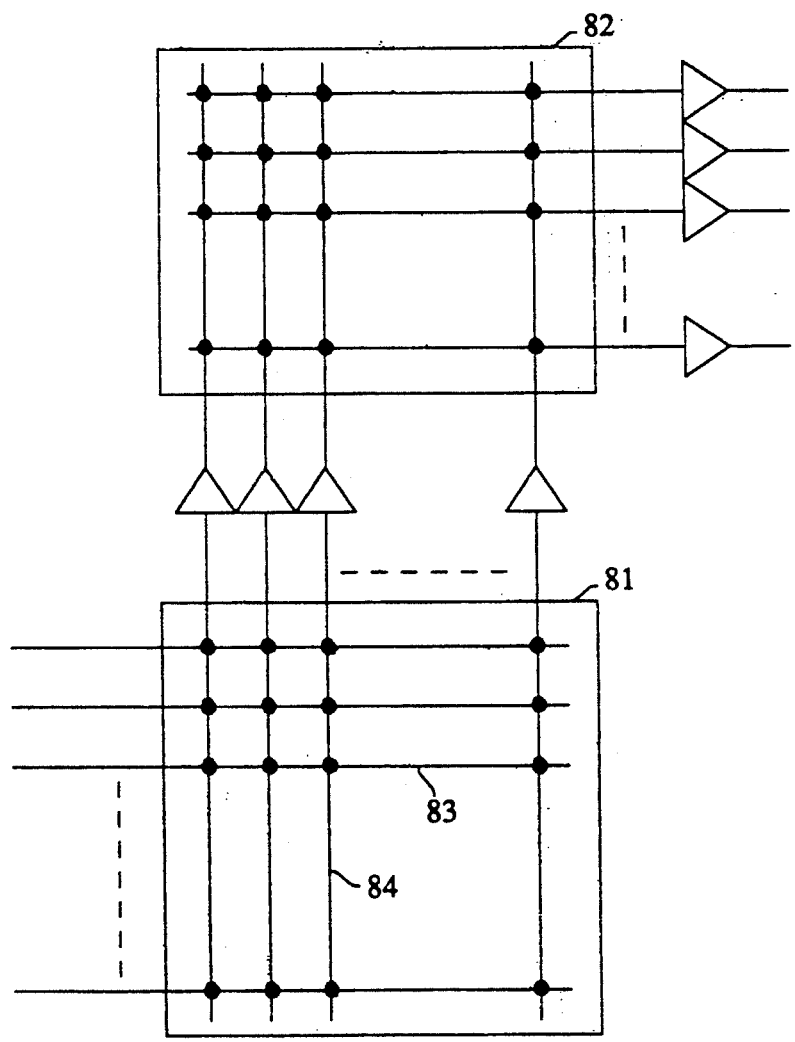
FIG. 7 depicts the structure of a two-layer neural network with analog-valued connection weights.

Current research attempts to solve this problem by having the classifier circuit "learn", through trial and error, to reach the correct decisions. One structure that has the potential for such "learning" is depicted in FIG. 7. This technique is commonly referred to in the art as "back propagation". It is described, for example, by D. E. Rumelhart et al. in "Learning Internal Representations by Error Propagation," in D. E. Rumelhart, J. L. McClelland (Eds.), Parallel Distributed Processing: Explorations in the Microstructure of Cognition, MIT Press, 1986, Chap. 8.

FIG. 7 comprises interconnection networks 81 and 82 that are serially connected. The input signal set is applied at the input of network 81, and the output signal set appears at the output of network 82. Each of the networks has a plurality of input and output leads, and each input lead is connected to all of the output leads. More specifically, each input lead i is connected to each output lead j through a connection weight $w_{ij}$. In our application, network 81 has 270 input leads and 40 output leads. Network 82 has 40 input leads and 10 output leads. The number of input leads of network 81 is dictated by the length of the feature vector. The number of outputs of network 82 is dictated by the number of characters in the classifying set. The number of intermediate leads (in this case, 40) is determined heuristically.

Training of the FIG. 7 circuit is carried out by applying a developed feature vector of a known character and adjusting the weights in both network 81 and 82 to maximize the output signal at the designated output lead of network 82 corresponding to the applied known character. All available samples of all the characters in the set to be classified are applied to the network in this fashion, and each time, the weights in the interconnection network are adjusted to maximize the signal at the appropriate output lead. In this manner, a set of weights $w_{ij}$ is developed for both networks.

It may be appropriate to explicitly mention that the connection weights $w_{ij}$ are analog in nature and that the circuit operates in an analog fashion. That is, the voltage at any output lead of network 81 is a sum of the contributions of the "fired up" weights connected to that output lead. Each weight is "fired up" by a binary signal on the input lead to which the weight is connected. Thus, the output at lead j equals $$\sum_i B_i w_{ij}$$

where $B_i$ is the value of the $i^{th}$ input lead (0 or 1).

Though the concept of such a learning network is fairly well understood, the task remains to realize such an analog circuit efficiently and compactly. The requirements on such a circuit are not trivial. For example, the minimum weight change, or modification, must be fairly small if optimization of the network is to be achieved. The iterative improvement methodology described above is based on the heuristic assumption that better weights may be found in the neighborhood of good ones, but that heuristic fails when the granularity is not fine enough. We found that for a small network 81, at least 8 bits of analog depth are necessary. Larger networks may require even finer granularity. The weights must also represent both positive and negative values, and changes must be easily reversible. During the learning and training session the number of changes to the weights can be quite large. Therefore, a practical circuit must allow for quick modification of the weights.

Taking these and other requirements into account, we have created an efficient analog connection weight, or strength, circuit with MOS VLSI technology.

Figure 8:
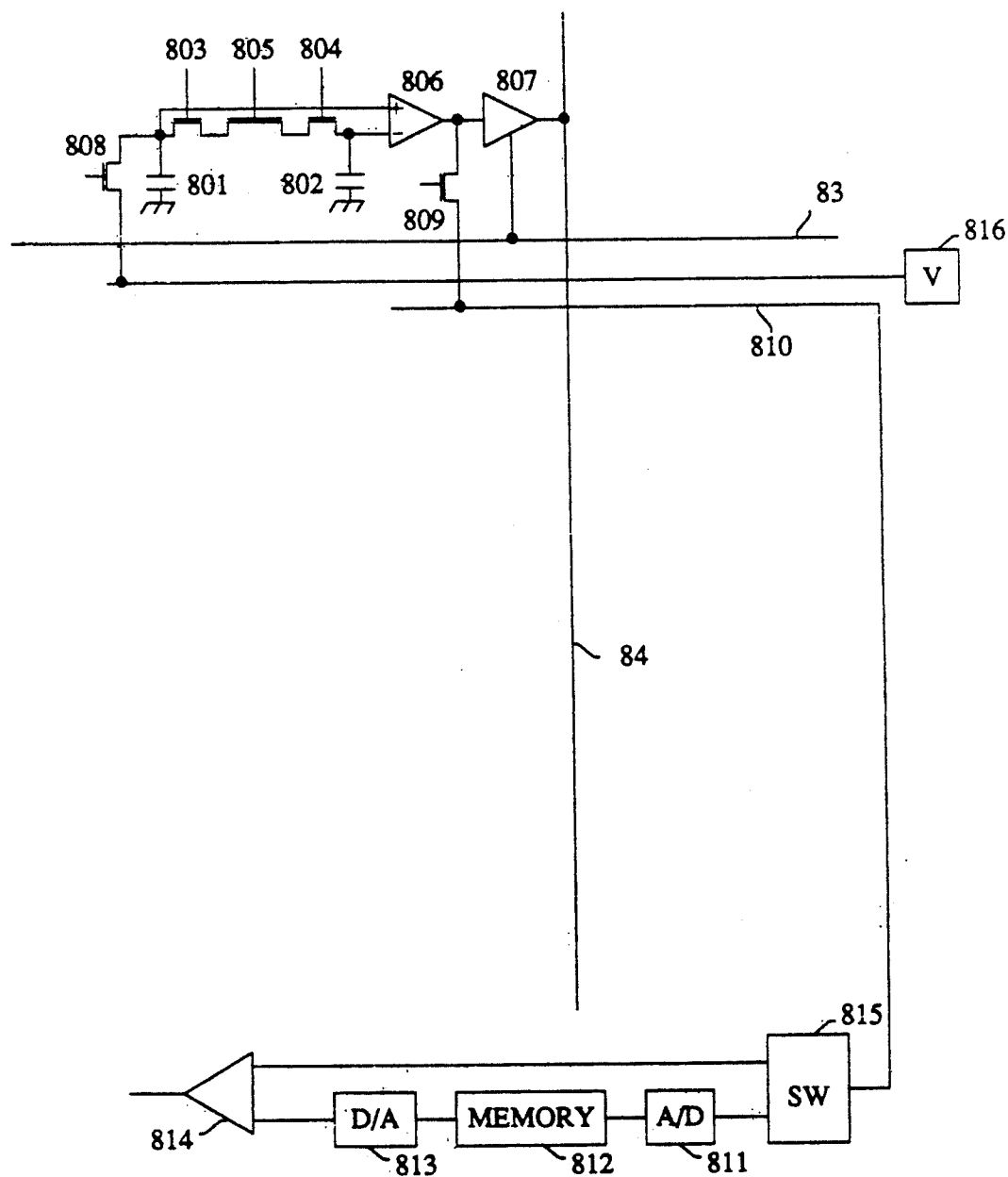
FIG. 8 illustrates one realization for an analog-valued connection weights neural network.

Whereas each connection weight in FIG. 7 is depicted with merely a black dot, FIG. 8 presents a circuit for implementing these dots. More particularly, FIG. 8 shows one connection weight circuit with its connection to input lines 83 and output line 84, as well as some common circuitry. Primarily, the interconnection weight portion of the FIG. 8 circuit includes capacitors 801 and 802, small MOS switches 803 and 804, a relatively large MOS transistor 805, a differential amplifier 806, and a multiplier 807. Secondarily, the circuit of FIG. 8 includes a charge-coupling switch 808, a sensing switch 809 and various control leads.

The circuit operates as follows. Capacitors 801 and 802 are charged to different voltage levels, and the difference in voltage levels is reflected in the output voltage of differential amplifier 806. Amplifier 806 has its two inputs connected to capacitors 801 and 802. The output of amplifier 806, which represents the connection weight, is connected to multiplier 807. Multiplier 807 can be any conventional transconductance amplifier. Also connected to multiplier 807 is input lead 83 of the interconnection network. The output of converter 807 is connected to an output lead of the interconnection network. Thus, multiplier 807 sends a current to the output lead that is a product of the signal at the input lead and the value of the connection weight. The connection weight is represented by the differential voltage developed by amplifier 806 in response to the difference in voltages between capacitors 801 and 802.

We have found that the difference in voltages on capacitors 801 and 802 is maintained for a long time (relative to the operations involved in OCR systems) and that no refreshing is necessary when the circuit is kept reasonably low temperatures. For example, at 77 degrees Kelvin no detectable loss has been noted with time. It may be observed that one advantage of our circuit is that the weight is proportional to $V_{C801} - V_{C802}$ and, therefore, even a loss in charge—when it is the same at both capacitors—results in no change to the weight.

Nevertheless, an avenue must clearly be provided for refreshing the information on capacitors 801 and 802. Moreover, an avenue must be provided for setting a voltage (charge) value on capacitors 801 and 802 and for modifying the set values to allow for the above-described "learning" procedure. This is where the remaining switches and controls come in.

To bring a connection weight to a desired level, switch 808 is closed momentarily to allow a fixed voltage level to be applied to capacitor 801 from voltage source 816. That voltage corresponds to a fixed charge. Thereafter, switch 808 is turned off. At this point, the weight of the connection is at a maximum positive level because capacitor 801 is connected to the non-inverting input of amplifier 806 and carries a positive voltage, while capacitor 802 is connected to the inverting input of amplifier 806. A change in the connection weight is accomplished in the following way.

First, transistors 803 and 805 are turned on. Transistor 803 is very small compared to transistor 805 and for the sake of a better understanding of what happens, transistor 803 can be thought of as being merely a switch. By comparison, transistor 805 is long and narrow and when it is on it can be thought of as a capacitor. When switch 803 is closed and transistor 805 (assuming it is an n channel device) is turned-on, the charge on capacitor 801 is distributed between the capacitor (801) and the inversion charge on the turned on transistor 805. Transistor 803 is then turned off, thereby trapping the charge in transistor 805. Transistor 804 is then turned on and if transistor 805 is slowly turned off, the mobile charge in its channel will diffuse through switch 804 into capacitor 802.

The above steps thus move a quantum of charge from capacitor 801 to capacitor 802. That corresponds to a change in the capacitors' voltages and in the interconnection weight.

The above sequence can be repeated as many times as necessary to bring the connection weights to the desired levels. In this manner, the optimization of the connection weights can proceed during the training period, with the result that each interconnection weight in networks 81 and 82 is set to the correct level.

The above description addresses the training aspect of the circuit. Once the learning process is over, means should be provided for 1) determining the values of the weights and 2) refreshing the weights to compensate for losses with time, etc. This is accomplished with the aid of sensing switch 809, and A/D converter, a D/A converter, and a non-volatile memory.

To determine the value of the weights in an interconnection network, all of the input leads are turned on, one at a time. Each time a lead is turned on, the sensing switches (809) of the weights connected to that input lead are sequentially turned on to allow each amplifier's voltage to appear on sensing bus 810. That voltage is applied to A/D converter 811 and the resulting digital information is stored in memory 812. All of the weights are converted to digital form in this manner and stored in memory 812. During a refresh operation, each connection weight is isolated in the manner described above, but this time the voltage output on sensing bus 810 is compared in amplifier 814 to the analog voltage of D/A converter 813, to which the digital output of memory 812 is applied. Of course, memory 812 is caused to deliver the digital output that corresponds to the refreshed connection weight. Based on the comparison results, the sequence of switching elements 803, 804, and 805 is controlled by the output signal of amplifier 814 to either increase or diminish the voltage of capacitor 801 relative to capacitor 802. The control of directing the output of bus 810 to either A/D converter 811 or to comparator amplifier 814 is effected by switch 815. Should it be necessary to completely discharge both capacitors 801 and 802, the voltage of source 816 can be reduced to zero and switches 803, 804, and 805 can be turned on.

APPENDIX

```
///////////////////////////////////////////////// // // fire.c  9/7/88   LDJ // //
check for broken images // returns -1 if completely blank // returns 0 if connected // returns 1 if connected except for samll flyspecks // returns 2 if badly disconnected // uses recursive brushfire algorithm // Diagnostic output: prints number of segments, // and location and code of the largest // Side effect: sets up Lseg (in rec2com)

// IMPORTANT ASSUMPTION:  fire1 assumes img.pix black pixels are POSITIVE // and white pixels are zero --- // If you can't guarantee that, call fire()
``` instead of fire() // negative pixels will cause trouble // This routine modifies img.pix !!

include <stdio.h> #include "rec2types.h" #include "err1.h" #include "fire.h"

inline int imin(int a, int b){return(a<b? a : b);} inline int imax(int a, int b){return(a>b? a : b);} static int xd1; // copy of img.x static int yd1; // and img.y static char** pix1;// and img.pix static Pair* p1; static Pair* p2; static int list_size = -1;

static Seg myseg;// segement being processed Seg Lseg;    // longest segment there is static int nseg; static int totpix;// total pixels in image int fire1(Image img){

// make sure we have allcated enough room to keep our pair-lists:
  int lsiz = img.x * img.y;// max possible size of list required
  if (lsiz > list_size) {
    if (p1) {
      delete p1;
      delete p2;
    }
    p1 = new Pair[lsiz];
    p2 = new Pair[lsiz];
    list_size = lsiz;
  }

Lseg.list = 0;// no longest segment yet
  Lseg.size = 0;// first seg will beat this for sure
  nseg = 0;
  totpix = 0;

// find first black pixel, so we can initiate the burn there:
  int xx; int yy;
  for (yy = 0; yy < img.y; yy++) {

```
      for (xx = 0; xx < img.x; xx++) {
        if (img.pix[yy][xx] > 0) {
```

///   fprintf(stderr, "firstx = %d  firsty = %d 0, xx, yy);

// a lot of these things might logically be arguments to burn(), // but static variables are faster & simpler.

```
          nseg++;// count this segment
          myseg.ashes = -nseg;              myseg.list = (Lseg.list != p1) ? p1 : p2;
          myseg.size = 0;
          xd1 = img.x; yd1 = img.y; pix1 = img.pix;
          burn(xx, yy);// burn, baby, burn!
          if (myseg.size > Lseg.size) Lseg = myseg;
        }
      }
    }
``` ifdef TEST

```
  fprintf(stderr, "Saw %d segments0, nseg);
  if (nseg) fprintf(stderr, "Longest (code %d) starts at %d %d0,
              Lseg.ashes, Lseg.list[0].x, Lseg.list[0].y); #endif
  if (nseg == 0) return -1;
  if (nseg == 1) return 0;
  float frac = float(Lseg.size) / float(totpix);
  const float minfrac = .9;
  if (frac >= minfrac) return 1;
  return 2;
```

}

// the magical recursive burning routine // turns to ashes all points that are 8-connected to the initial point void burn(
  int xcent,
  int ycent     // center of 3 x 3 region of interest ){

// if this point is off-scale:
    if(xcent<0  ycent<0   xcent>=xd1   ycent>=yd1) return;

// NOTE: this is indeed a check for > 0, // not just nonzero, so things don't burn twice.

```
if(pix1[ycent][xcent] > 0){
  int top = myseg.size++;// keep track of length of segment
  totpix++;   // count total pixels
  pix1[ycent][xcent] = myseg.ashes;// turn this point to ashes
  myseg.list[top].x = xcent;
  myseg.list[top].y = ycent;

burn(xcent+1, ycent+1);// ignite neigbors
  burn(xcent+1, ycent  );
  burn(xcent+1, ycent-1);

burn(xcent  , ycent+1);
  burn(xcent  , ycent-1);
  burn(xcent-1, ycent+1);
  burn(xcent-1, ycent  );
  burn(xcent-1, ycent-1);

define jumpbreaks YES #ifdef jumpbreaks int jump = imax(xd1, yd1);
  jump = jump / 20;
  if (jump < 3) jump = 3;
  if (jump > 1) {
    burn(xcent+jump, ycent+jump);// ignite more distant neigbors
    burn(xcent+jump, ycent  );
    burn(xcent+jump, ycent-jump);

burn(xcent  , ycent+jump);
    burn(xcent  , ycent-jump);

burn(xcent-jump, ycent+jump);
    burn(xcent-jump, ycent  );
    burn(xcent-jump, ycent-jump);
  } endif
```

} // if this point NOT set, or already burned, do nothing
return; }

//////////////////////////////////////////////////// // same as above, but does not assume that black pixels are positive; // non-zero suffices.

```
int fire(Image img){
  for (int yy = 0; yy < img.y; yy++){
    for (int xx = 0; xx < img.x; xx++){
      img.pix[yy][xx] = img.pix[yy][xx] != 0;
    }
  }
  return ( fire1(img) ); }
```

*************************************************************

////////////////////////////////////////////////
//////////////////////////////////////////////// // do most of the work for linear transformation program // // perform linear transformations on post office data // i.e. convert to standard size and aspect ratio // see lin.plan for extended discussion // Note: xypix[][] will contain small integers 0..9 // for graylevels below threshold, you get zero; // for graylevels above threshold, you get the graylevel number // This gives you the option of treating it as a boolean // if you don't care about graylevels.

// Caller allocates the array; we fill it.

```
#include <stdio.h> #include <math.h> #include "new_array.h" #include
"/nets/util/util.h" #include "rec2types.h" #include "do_lin.h"

inline float fmin(float a, float b){return(a<b? a : b);} inline float fmax(float a, float
b){return(a>b? a : b);}
```

```
inline int imin(int a, int b){return(a<b? a : b);} inline int imax(int a, int
b){return(a>b? a : b);}

//////////////////////////////////////////////////////// void do_lin(
  const Image raw,// input image
  const int known_fit,// 1 ==> char already fills box pdim by qdim.
  Image des,    // result : array of small integers
  FILE* param_fp,// parameter file filepointer         // 0 ==> all parameters
take default values
  const char* sname// filename, for informational messages         // provide
"" if you can't do better ){

Pair* bl;

bl = new Pair[raw.x*raw.y];// safe; probably overestimate # of black pixels
  int ibl = 0;
  int pp, qq;
  for (qq = 0; qq < raw.y; qq++) {
    for (pp = 0; pp < raw.x; pp++) if (raw.pix[qq][pp]) {
      bl[ibl].x = pp;
      bl[ibl].y = qq;
      ibl++;
    }
  } do_lin1(raw.x, raw.y, bl, ibl, known_fit, des, param_fp, sname);
  delete(bl);

}

//////////////////////////////////////////////////////// void do_lin1(
  const int pdim,// size of input array
  const int qdim,// ..
  const Pair* bl,// input : list of black pixels
  const int nbl, // size of said list
  const int known_fit,// 1 ==> char already fills box pdim by qdim.
```

Image des,    // result : array of small integers
FILE* param_fp,// parameter file filepointer          // 0 ==> all parameters take default values
const char* sname// filename, for informational messages          // provide "" if you can't do better ){

Fget(kernel, 2);// convolution kernel (units of PQ rows/cols)
Iget(mingray, 3);// this or larger: return graylevel, else return zero
Fget(fcorn, .7);// fatness corner
Iget(info, 0);// report miscellaneous information
Iget(inflate, 0);// 1 ==> small chars can grow, fatness can change
float pkern = kernel;
float qkern = kernel;

const int x0 = 0;
const int y0 = 0;
const float xmid = (des.x - x0) / 2.0;
const float ymid = (des.y - y0) / 2.0;

///////////////////////////////// // find raw bounding box int p0, q0, p2, q2;
int ibl;
int pp, qq;
if (known_fit) {
  p0 = 0; q0 = 0;
  p2 = pdim; q2 = qdim;
} else {
  p0 = bl[0].x; q0 = bl[0].y;
  p2 = p0; q2 = q0;
  for (ibl = 1; ibl < nbl; ibl++){
    pp = bl[ibl].x; qq = bl[ibl].y;
    p0 = imin(p0, pp);
    p2 = imax(p2, pp);
    q0 = imin(q0, qq);
    q2 = imax(q2, qq);
  }
  p2++; q2++;
}

///////////////////////////////////// // calculate some moments:

float** xyflt = new_float(des.y, des.x);

// note that we are treating the pixels as BOXES of ink, not points // so the (0,0) pixel extends from (0,0) to (1-eps,1-eps) // and has its center at (.5, .5)

float pmid = (p0 + p2) / 2.0;

float qmid = (q0 + q2) / 2.0;

// but if we shift the middle half a bit, // we can pretend the (0,0) pixel is centered at (0,0)

float pmx = pmid - .5;

float qmx = qmid - .5;

float mpq = 0.;// PQ moment float mqq = 0.;// QQ moment for (ibl = 0; ibl < nbl; ibl++) { pp = bl[ibl].x; qq = bl[ibl].y;

mpq += (qq - qmx)*(pp - pmx);

mqq += (qq - qmx)*(qq - qmx);

} float theta = mpq / mqq; // Note: since pixels are numbered from UPPER left, // positive theta corresponds to " // negative theta corresponds to "/"

// (pt, qt) is the coordinate where (p,q) will go when the char is deskewed. // This is not quite the same as (x,y) since the latter // has size changes as well.

// Calculate min and max horiz coordinates, // measured relative to a line parallel to the sides of the parallelogram // [the reference line goes through (pmid, qmid) // which is the middle of the raw PO rectangle] #define pmap(p,q) (p-pmx - (q-qmx)*theta)

float pt0 = pmap(bl[0].x, bl[0].y) ;// leftmost black pixel float pt2 = pt0;// rightmost black pixel for (ibl = 1; ibl < nbl; ibl++) { float xxx = pmap(bl[ibl].x, bl[ibl].y) ;

pt0 = fmin(pt0, xxx);

pt2 = fmax(pt2, xxx);

}

```
// The points we just calculated are centers of parallelogram boxes // Calculate
how much the box sticks out from there.
   pt2 += .5*fabs(theta) + .501;//.001 to catch roundoff errors
   pt0 -= .5*fabs(theta) + .501;

float dsw = pt2 - pt0 ;// deskewed width
   float kf = dsw / (p2-p0);// krunch factor       // usually (but not always)
less than 1              // (not used in further calculations)
   float conwid = dsw + pkern - 1.;// pretend wider to make room for convolution
   float conhgt = q2 - q0 + qkern - 1;// and taller, also for convolution
   float qtmid = qmid + (qkern-1.) / 2.;// height of middle of char
   float ptmid = pmid + pt0 + .5*conwid + theta*(qkern-1.)/2.;// p coord of middle
of char
   float fat = conwid / conhgt;// fatness ratio of the parallelogram
   float dfat = des.x / (float) des.y;// desired fatness ratio
   float nfat = fat / dfat;// normalized fatness ratio
   if (info)
      fprintf(stdout, "%s    w: %d,  h: %d,  th: %5.2f, dsw: %5.2f, kf: %5.2f, nfat:
%5.2f0,          sname, p2-p0, q2-q0, theta, dsw, kf, nfat);

///////////////////////////////// // calculate the coefficients of the linear
transformation:
   float d00, d01, d02, d10, d11, d12;

if (inflate) { // old "inflationary" scheme
      float fif = nfat > fcorn ?              1./nfat : 1./fcorn;// fatness increasing
factor
      d10 = 0.;   // pure skew
      d11 = (des.y-y0) / conhgt;// make output char fill its box vertically
      d00 = d11 * fif;
      d01 = - d11 * fif * theta;
      d02 = xmid - d00*ptmid - d01*qtmid;// center point is fixed point
      d12 = ymid - d10*ptmid - d11*qtmid;
   }
   else {      // never inflate scheme
      float ygrow = (des.y-y0) / conhgt;
      float xgrow = (des.x-x0) / conwid;
      float dogrow = fmin(xgrow, ygrow);// grow as little as possible
```

```
              // i.e. shrink so BOTH fit
  dogrow = fmin(1.0, dogrow);// but NEVER really inflate
  d10 = 0;     // pure skew
  d11 = dogrow;// shrink y
  d00 = dogrow;// and x equally
  d01 = -dogrow * theta;
  d02 = xmid - d00*ptmid - d01*qtmid;// center point is fixed point
  d12 = ymid - d10*ptmid - d11*qtmid;
  }

// make the output space all white
  int xx, yy;
  for (yy = y0; yy < des.y; yy++){
    for (xx = x0; xx < des.x; xx++){
      xyflt[yy][xx] = 0.;
    }
  }

// and start bequeathing blackness
  int spip = imax(1, int(10*d11));// spip == scans per input pixel
  float step = pkern / spip;
  float offset = step / 2.;
  int ii;
  float fy, fq;
  int iy;
  float fx0, fx2;
  int ix0, ix2;
  float rx0, rx2;

#define oops(X) {fprintf(stderr, "oops (X) %s %f %f0, sname, fx0, fx2);
continue;}
  for (ibl = 0; ibl < nbl; ibl++){// loop over black input pixels
    pp = bl[ibl].x; qq = bl[ibl].y;
    fx0 = d00*pp     +   d01*qq+d02;// start of scan line (in x space)
    fx2 = d00*(pkern+pp) +d01*qq+d02;// end of scan line (..)
    ix0 = int(fx0);// integer parts
    ix2 = int(fx2);
    rx0 = fx0 - ix0;// remainders
```

```
    rx2 = fx2 - ix2;
    if (ix0 < 0) oops(1) ;// error checks & defence
    if (ix0 >= des.x) oops(2) ;
    if (ix2 < 0) oops(3) ;
    if (ix2 >= des.x) oops(4) ;
    for (ii = 0; ii < spip; ii++){// loop over scan lines per input pixel
      fq = qq + offset + step*ii;
      fy = d10*pp + d11*fq + d12;
      iy = (int) fy;
      if (iy < 0) oops(5) ;
      if (iy >= des.y) oops(6) ;
      xyflt[iy][ix0] -= rx0;
      xyflt[iy][ix2] += rx2;
      for (int jj = ix0; jj < ix2; jj++){            xyflt[iy][jj] += 1.0;
      }
    }
  }

// clip the bottom off of the gray-scale // using questionable threshold scheme //
first, find blackest output pixel
  float zmax = 0;
  for (yy = y0; yy < des.y; yy++ ) {
    for (xx = x0; xx < des.x; xx++ ) {
      zmax = fmax(zmax, xyflt[yy][xx]);
    }
  }

// then clip away....
  for (yy = y0; yy < des.y; yy++ ) {
    for (xx = x0; xx < des.x; xx++ ) {
      float zz = xyflt[yy][xx] ;
      int gr = int(9.9 * zz / zmax);
      if (gr < mingray) gr = 0;
      des.pix[yy][xx] = gr;
    }
  }

///////////////////////////////////// // put away all our toys:
  delete2(xyflt); }
```

We claim:

1. A method for thinning lines of an image composed of an array of pixels, comprising:
- a first step of selecting a window of size k×k, where k is an integer ≧3,
- a step of applying thinning criteria to a portion of said image covered by said window to determine whether a core subportion of said image can be deleted,
- a step of deleting said core subportion when said step of applying thinning criteria indicate that said core subportion should be deleted,
- a step of reducing the size of said window by decreasing the value of k by one when said step of applying thinning criteria indicate that said core subportion should not be deleted,
- a step of returning control to said step of applying thinning criteria when said step of reducing size yields a size of k greater than 2, and
- a step of selecting another window following said step of returning control and following said step of deleting.

2. The method of claim 1 wherein said core subportion is of size (k−2)×(k−2).

3. The method of claim 1, further including a step, following said step of selecting another window, of selecting another portion of said image to interact with said template in said step of applying a thinning criteria.

4. The method of claim 1 wherein said step of applying thinning criteria applies said thinning criteria to different portions of said image in parallel.

5. The method of claim 1 wherein said step of applying thinning criteria sequentially applies said thinning criteria to different portions of said image.

* * * * *